Feb. 10, 1953
H. M. MAERSCH
2,627,991
COVERED SERVING DISH
Filed Nov. 21, 1949
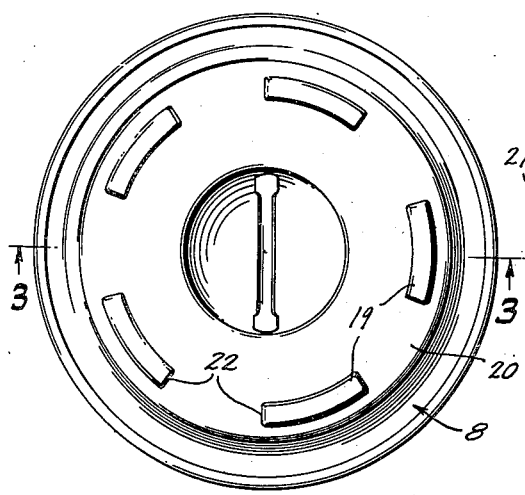
Fig. 1
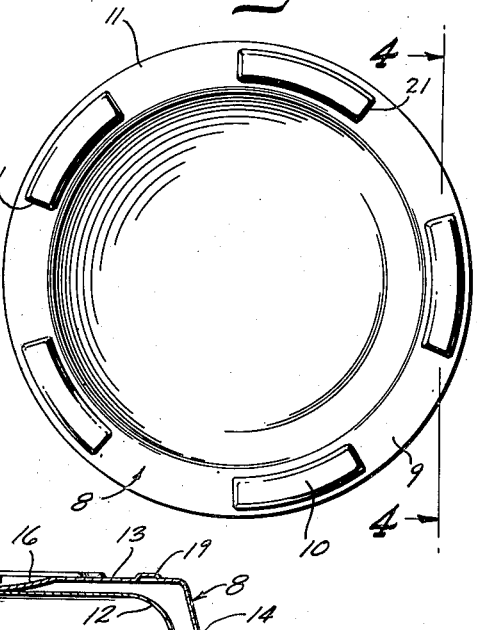
Fig. 2
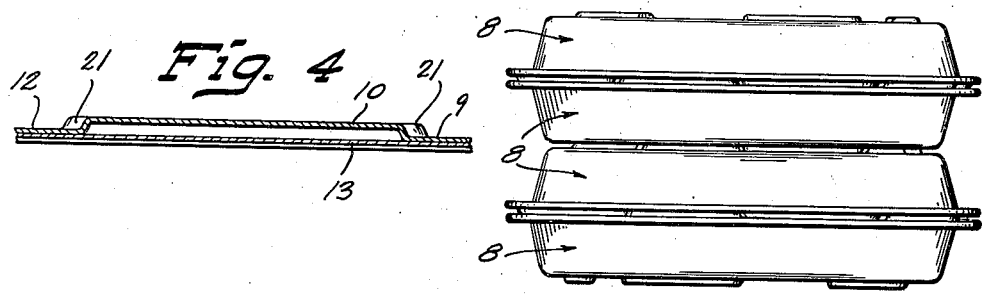
Fig. 3
Fig. 4
Fig. 5
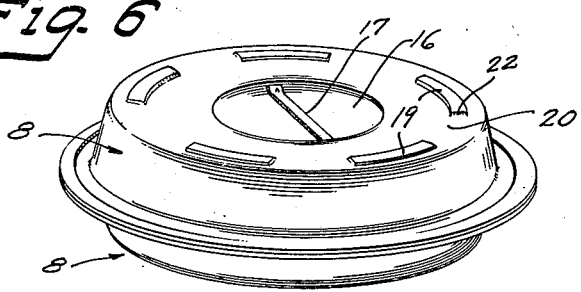
Fig. 6
INVENTOR.
Helen M. Maersch
BY
David G. Foy
Attorney Patented Feb. 10, 1953

2,627,991

UNITED STATES PATENT OFFICE 2,627,991

COVERED SERVING DISH

Helen M. Maersch, Sheboygan, Wis.

Application November 21, 1949, Serial No. 128,562

3 Claims. (Cl. 220—4)

The invention relates to covered serving units and more particularly to food serving covered dishes.

Heretofore, it has been the practice in serving units where a serving dish was to be covered to provide a separate lower dish with a differently formed upper cover so as to provide interfitting rims which interlocked to prevent sideward displacement of the cover. This required that the dish and cover be different and be mated making it necessary after the dishes were washed that they be sorted for re-assembly in pairs for further use.

The object of the present invention is to provide a serving dish which is so formed that it may serve either as a lower dish or an upper cover and which will cooperate with another identically formed dish to form a complete covered dish serving unit inherently interlocked against sideward displacement, and further to provide dishes which when assembled into covered dish serving units may also be stacked with other like units, said units being inherently interlocked against sideward displacement, each dish being a substantially identical counterpart of every other dish so that no sorting and mating is necessary.

The invention further consists in the several features hereinafter described and more particularly defined by claims at the conclusion hereof.

In the drawings:

Fig. 1 is a bottom plan view of one of the dishes embodying the invention;

Fig. 2 is a top plan view of said dish;

Fig. 3 is a vertical sectional view taken on the line 3—3 of Fig. 1;

Fig. 4 is a detailed enlarged vertical sectional view taken on the line 4—4 of Fig. 2;

Fig. 5 is an elevation view of a plurality of stacked serving units;

Fig. 6 is a perspective view of a serving unit embodying the invention.

Referring to the drawings, the numeral 8 designates generally a dish, the outer rim of which is disposed in a plane which may be brought into abutting engagement with the facing outer rim of another, substantially identical, dish 8 inverted on the first dish 8 to form a covered serving unit. The first or lower dish 8 acts as a container, and the second or upper dish 8 acts as a cover to keep the contents of the unit hot. In any such serving unit, the two members forming the unit should be prevented from slipping sideways relative to each other in case they be jarred or tipped for any reason from a horizontal position, and for this purpose it has been the practice to form the members of a serving unit as separate and distinctly different members so that the cover would have a part of different diameter to fit within or without a ledge on the dish making it necessary that the parts be mated. According to the present invention, each of the dishes has a top rim portion 9 disposed in a plane and provided with a plurality of arcuate elevated portions or bosses 10 separated by depressed or unraised portions 11 therebetween, the arcs intercepted by the elevated portions 10 being substantially equal to the arcs intercepted by the unraised portions 11 between them. The elevated portions 10 are of considerable width radially and terminate with ends which are substantially radially disposed. Where the dish is circular as shown, the portions 10 form equally spaced segmental areas of a circle whose center is the center of the dish. With such a construction any dish may mate or interlock with any other like dish since the unraised portions of the one fits the elevations of the other, so that when the dishes are brought together as shown in Figs. 5 and 6, they form covered serving units.

The restraint of lateral displacement of the parts is produced in the serving unit of this invention by the radially converging end faces 21 of the raised portions 10. Because these faces all converge, a wedging action occurs when a displacing force is applied, the action being dependent upon a substantial width in the raised portions.

Each dish is preferably formed from two sheet metal stampings, one of which 12 forms the bottom proper and the rim 9; and the other of which 13 forms a base or an insulating shell secured at its rim 14 to the part 12 by an overlapped flange 15 of the rim 9. The base 13 is provided with a depressed central portion 16 whose center may abut the bottom of the part 12 for reinforcement and which also may have a bar 17 spanning the depressed portion 16 to form a handle. The parts 12 and 13 as so arranged provide a dead air or heat insulating space 18. While a double walled metal dish is preferred, the invention may be used on dishes made of china, plastic, or other suitable material.

As a further additional feature the base portions 13 of the dishes may be provided with a plurality of elevated portions or bosses 19 with unraised portions 20 therebetween, the length of each elevated portion 19 being substantially equal to the length of the unraised portions 20. The ends 22 of the raised portions 19 perform a positive centering function as explained previously in connection with end faces 21. With this arrangement sets of serving units may be stacked on each other as shown in Fig. 5 and be interlocked with each other, so that lateral displacement of one unit relative to the other is restrained.

Where the dishes are formed as metal stampings, the elevated portions or bosses 10 and 19 are formed by forcing these portions out from the main plane of the dish by dies or other suitable means.

While the dishes shown have five elevated portions, it will be obvious that the invention is not to be limited to this number since two or more properly spaced raised portions are sufficient and that other modifications may be made without departing from the invention.

What I claim as my invention is:

1. A serving unit comprising a pair of serving dishes for use as a covered container, each dish having a food receiving cavity and an annular flat rim portion extending laterally from the top of said cavity and provided with equally circumferentially spaced, equal height, equal area, segmental bosses with radially disposed end faces of substantial radial extent and whose arcuate sides are spaced from the inner and outer edges of the rim whose unraised flat portions between and about said bosses are all in the same plane, the projections of one dish interfitting with those of the other dish to provide a substantial load carrying abutting interlocking area between the rims of the dishes extending about the entire rim to prevent lateral displacement of the dishes relative to each other and provide substantial vertical stability.

2. A serving unit comprising a pair of serving dishes for use as a covered container, each dish having a food receiving cavity and an annular flat rim portion extending laterally from the top of said cavity and provided with equally circumferentially spaced, equal height, equal area segmental bosses with radially disposed end faces of substantial radial extent and whose arcuate sides are spaced from the inner and outer edges of the rim whose unraised portions between and about said bosses are all in the same plane, the bosses of one dish interfitting with those of the other dish to provide a substantial load carrying abutting interlocking area between the rims of the dishes extending about the entire rim to prevent lateral displacement of the dishes relative to each other and provide substantial vertical stability, and each dish having an unraised plane bottom portion provided with equally radially disposed, equally circumferentially spaced, equal height, equal area segmental bosses with radially disposed end faces of substantial extent and whose arcuate outer sides are spaced nearer to the outer edge of said bottom portion than their inner sides are spaced from the center of said bottom portion, the bottom projections of one dish interfitting with those of another similar dish to provide a substantial load carrying abutting interlocking area extending about the entire circumferential area containing said bosses whereby interlocked covered containers may be stacked on each other without lateral displacement of the individual containers or the dishes forming said containers and without danger of toppling.

3. A plurality of stackable serving dishes, each of identical form having a food receiving cavity, a flat rim portion extending laterally from the top of said cavity and a bottom, the major portion of whose surface is flat and parallel to said rim portion and which bottom acts as a bottom for one of a pair of dishes and as a top for the other inverted dish of said pair, each of said dishes having flat topped radially disposed sets of segmental bosses, one set protruding from the flat surface of said rim and the other set protruding from the flat surface of said bottom and the bosses of each set being equidistantly circumferentially spaced from each other so that the bosses of one dish interlock with those of a juxtaposed dish to prevent lateral displacement of the dishes relative to each other and of substantially equal height so that when the rim portions of a pair of dishes are brought into juxtaposition the top surfaces of the bosses of one dish engage the flat surface of the rim of the other dish and when the bottom of one dish is brought into juxtaposition with the inverted bottom of another dish the top surfaces of the bosses of one such dish engage the flat surface of the bottom of the other dish, the height of the bosses on the rim and bottom of each dish being less than the width and length of said bosses whereby bringing the bosses of juxtaposed dishes into interlocking relation with each other may be effected by a slight canting and sliding movement of superposed dishes relative to each other.

HELEN M. MAERSCH.

REFERENCES CITED

The following references are of record in the file of this patent:

UNITED STATES PATENTS

| Number | Name | Date |
|---|---|---|
| 1,717,974 | Heinrichs | June 18, 1929 |
| 2,146,925 | Ahrbecker et al. | Feb. 14, 1939 |
| 2,174,425 | Schlumbohm | Sept. 26, 1939 |
| 2,289,037 | Poglein | July 7, 1942 |
| 2,298,814 | Weis | Oct. 13, 1942 |
| 2,412,325 | Devine et al. | Dec. 10, 1946 |
| 2,417,195 | Hargreaves | Mar. 11, 1947 |